United States Patent
Ito et al.

(10) Patent No.: US 6,573,320 B2
(45) Date of Patent: Jun. 3, 2003

(54) ACRYLIC RESIN COMPOSITION, PAINTED-FILM MOLDED RESIN PLATE USING THE SAME, AND COATING MEMBER FOR SOLAR CELL PANEL

(75) Inventors: Tomohiro Ito, Yokosuka (JP); Mikiya Shinohara, Yokohama (JP); Takashi Seino, Yokosuka (JP); Kouichi Handa, Miura (JP)

(73) Assignee: Nissan Motor Co., Ltd., Kanagawa-ken (JP)

(*) Notice: Subject to any disclaimer, the term of this patent is extended or adjusted under 35 U.S.C. 154(b) by 83 days.

(21) Appl. No.: 09/799,057

(22) Filed: Mar. 6, 2001

(65) Prior Publication Data
US 2001/0034396 A1 Oct. 25, 2001

(30) Foreign Application Priority Data

Mar. 14, 2000 (JP) .......................... 2000-071110
Oct. 2, 2000 (JP) ........................ 2000-302156

(51) Int. Cl.[7] ................................. C08L 5/24
(52) U.S. Cl. .................. 524/261; 524/397; 524/547; 524/916; 523/216; 523/116; 526/212; 526/279
(58) Field of Search ................. 524/261, 547, 524/916, 397; 526/279, 212; 523/216, 116

(56) References Cited

U.S. PATENT DOCUMENTS

| 3,706,697 A | 12/1972 | Backderf | 260/29.2 M |
| 3,951,893 A | 4/1976 | Gander | 260/23 AR |
| 4,810,540 A | 3/1989 | Ellison et al. | 428/31 |
| 5,952,048 A | * 9/1999 | Tsubuko et al. | 427/288 |
| 5,986,015 A | * 11/1999 | Midha et al. | 525/331.4 |
| 5,998,498 A | * 12/1999 | Vanderlaan et al. | 351/160 H |
| 6,005,028 A | * 12/1999 | Paul | 522/172 |
| 6,020,445 A | * 2/2000 | Vanderlaan et al. | 526/212 |

FOREIGN PATENT DOCUMENTS

| DE | 4017075 A1 | 11/1991 |
| FR | 2154638 | 9/1972 |
| JP | 63-120640 | 5/1988 |
| JP | 02-503077 | 9/1990 |
| JP | 63-123469 | 5/1998 |

OTHER PUBLICATIONS

Soichi Muroi, and Hidekazu Ishimura, "Introduction To Epoxy Resin," Polymer Publishing Association, Jun. 20, 1998, p.p. 128–129.

* cited by examiner

Primary Examiner—David W. Wu
Assistant Examiner—Henry S. Hu
(74) Attorney, Agent, or Firm—McDermott, Will & Emery

(57) ABSTRACT

An acrylic resin composition comprises an organic silicon based compound that can be copolymerised with or mixed with acryl monomer or methacryl monomer in the acrylic resin. The acrylic resin composition may contain inorganic fine grains of which the hydroxyl group or the methyl group is bonded to their surface. A painted-film molded resin plate and a coating member for a solar cell panel use the above acrylic resin composition.

3 Claims, 13 Drawing Sheets

FIG.5

Table 1

| Sample No. | *2) Amount of contained Organic Silicon(wt%) | Frictional resistance | Rockwell hardness | Heiz-value after the scratch-test | Transmittance (%) |
|---|---|---|---|---|---|
| *1) 1 | 0 | △ | 100 | 0.5 | ◯ 93 |
| 2 | 1 | ◯ | 100 | 0.3 | ◯ 92 |
| 3 | 5 | ◯ | 100 | 0.3 | ◯ 92 |
| 4 | 10 | ◯ | 100 | 0.3 | ◯ 92 |
| 5 | 30 | ◯ | 90 | 0.5 | △ 90 |
| 6 | 40 | ◯ | 85 | 0.7 | × 85 |

◯ : Good   △ : Not good   × : Bad

*1) sample in the prior art
*2) single side end-double bond type

FIG.6

Table 2

| Sample No. | *) Amount of contained Organic Silicon(wt%) | Frictional resistance | Rockwell hardness | Heiz-value after the scratch-test | Transmittance (%) |
|---|---|---|---|---|---|
| 1 | 0 | △ | 100 | 0.5 | ◯ 93 |
| 2 | 1 | ◯ | 100 | 0.3 | ◯ 92 |
| 3 | 5 | ◯ | 100 | 0.3 | ◯ 92 |
| 4 | 10 | ◯ | 98 | 0.3 | ◯ 92 |
| 5 | 30 | ◯ | 90 | 0.5 | △ 89 |
| 6 | 40 | ◯ | 85 | 0.7 | × 85 |

◯ : Good   △ : Not good   × : Bad

*) both side ends-double bond type

FIG.7

Table 3

| Sample No. | *)Amount of contained Organic Silicon (wt%) | Frictional resistance | Rockwell hardness | Heiz-value after the scratch-test | Transmittance (%) | |
|---|---|---|---|---|---|---|
| 1 | 0 | △ | 100 | 0.5 | △ | ○ | 93 |
| 2 | 1 | ○ | 100 | 0.3 | ○ | ○ | 92 |
| 3 | 5 | ○ | 100 | 0.3 | ○ | ○ | 92 |
| 4 | 10 | ○ | 98 | 0.3 | ○ | ○ | 92 |
| 5 | 30 | ○ | 90 | 0.5 | △ | △ | 89 |
| 6 | 40 | ○ | 85 | 0.7 | × | × | 85 |

○ : Good  △ : Not good  × : Bad

*)single side end-hydroxyle group type

FIG.8

Table 4

| Sample No. | Amount of contained *)Organic Silicon (wt%) | Amount of contained Silica (wt%) | Frictional resistance | Rockwell hardness | Heiz-value after the scratch-test | Transmittance (%) |
|---|---|---|---|---|---|---|
| 1 | 0 | 0 | △ | 100 | 0.5 | △ | 93 |
| 2 | 5 | 5 | ○ | 100 | 0.3 | ○ | 92 |
| 3 | | 10 | ○ | 105 | 0.3 | ○ | 92 |
| 4 | | 15 | ○ | 110 | 0.3 | ○ | 92 |
| 5 | 10 | 5 | ○ | 100 | 0.3 | ○ | 92 |
| 6 | | 10 | ○ | 103 | 0.3 | ○ | 92 |
| 7 | | 15 | ○ | 105 | 0.3 | ○ | 92 |
| 8 | 30 | 5 | ○ | 90 | 0.5 | △ | 90 |
| 9 | | 10 | ○ | 95 | 0.5 | △ | 90 |
| 10 | | 15 | ○ | 98 | 0.5 | △ | 90 |

*) single side end-double bond type

○ : Good  △ : Not good

FIG.9

Table 5

| Sample No. | Amount of contained *)Organic Silicon (wt%) | Amount of contained Silica (wt%) | Frictional resistance | Rockwell hardness | | Heiz-value after the scratch-test | | Transmittance (%) | |
|---|---|---|---|---|---|---|---|---|---|
| 1 | 0 | 0 | △ | 100 | ○ | 0.5 | △ | 93 | ○ |
| 2 | 5 | 5 | ○ | 100 | ○ | 0.3 | ○ | 92 | ○ |
| 3 | | 10 | ○ | 105 | ○ | 0.3 | ○ | 92 | ○ |
| 4 | | 15 | ○ | 110 | ○ | 0.3 | ○ | 92 | ○ |
| 5 | 10 | 5 | ○ | 100 | ○ | 0.3 | ○ | 92 | ○ |
| 6 | | 10 | ○ | 102 | ○ | 0.3 | ○ | 92 | ○ |
| 7 | | 15 | ○ | 104 | ○ | 0.3 | ○ | 92 | ○ |
| 8 | 30 | 5 | ○ | 90 | △ | 0.5 | △ | 90 | △ |
| 9 | | 10 | ○ | 94 | △ | 0.5 | △ | 90 | △ |
| 10 | | 15 | ○ | 96 | △ | 0.5 | △ | 90 | △ |

*) both side ends-double bond type

○ : Good    △ : Not good

FIG.10

Table 6

| Sample No. | *)Amount of contained Organic Silicon (wt%) | Amount of contained Silica (wt%) | Frictional resistance | Rockwell hardness | | Heiz-value after the scratch-test | | Transmittance (%) | |
|---|---|---|---|---|---|---|---|---|---|
| 1 | 0 | 0 | △ | 100 | ○ | 0.5 | △ | 93 | ○ |
| 2 | 5 | 5 | ○ | 100 | ○ | 0.3 | ○ | 92 | ○ |
| 3 | | 10 | ○ | 103 | ○ | 0.3 | ○ | 92 | ○ |
| 4 | | 15 | ○ | 108 | ○ | 0.3 | ○ | 92 | ○ |
| 5 | 10 | 5 | ○ | 100 | ○ | 0.3 | ○ | 92 | ○ |
| 6 | | 10 | ○ | 102 | ○ | 0.3 | ○ | 92 | ○ |
| 7 | | 15 | ○ | 104 | ○ | 0.3 | ○ | 92 | ○ |
| 8 | 30 | 5 | ○ | 90 | △ | 0.5 | △ | 90 | △ |
| 9 | | 10 | ○ | 93 | △ | 0.5 | △ | 90 | △ |
| 10 | | 15 | ○ | 95 | △ | 0.5 | △ | 90 | △ |

○ : Good    △ : Not good

*)single side end-hydroxyle group type

FIG.11

Table 7

| Sample No. | Amount of contained*Silica(wt%) | Rockwell hardness | | Heiz-value after the scratch-test | | Transmittance (%) | |
|---|---|---|---|---|---|---|---|
| 1 | 0 | 100 | ○ | 0.5 | △ | 93 | ○ |
| 2 | 1 | 100 | ○ | 0.3 | ○ | 92 | ○ |
| 3 | 5 | 103 | ○ | 0.3 | ○ | 92 | ○ |
| 4 | 10 | 107 | ○ | 0.3 | ○ | 92 | ○ |
| 5 | 30 | 115 | ○ | 0.5 | △ | 90 | △ |
| 6 | 40 | 120 | ○ | 0.7 | × | 90 | △ |

○: Good   △: Not good   ×: Bad   *) having the acrylate group on the surface

FIG.12

Table 8

| Sample No. | Amount of contained*Silica(wt%) | Rockwell hardness | | Heiz-value after the scratch-test | | Transmittance (%) | |
|---|---|---|---|---|---|---|---|
| 1 | 0 | 100 | ○ | 0.5 | △ | 93 | ○ |
| 2 | 1 | 100 | ○ | 0.3 | ○ | 92 | ○ |
| 3 | 5 | 103 | ○ | 0.3 | ○ | 92 | ○ |
| 4 | 10 | 105 | ○ | 0.3 | ○ | 92 | ○ |
| 5 | 30 | 110 | ○ | 0.5 | △ | 90 | △ |
| 6 | 40 | 115 | ○ | 0.7 | × | 90 | △ |

○: Good   △: Not good   ×: Bad   *) having the methyl group on the surface

FIG.13

Table 9

| Sample No. | Amount of contained *1)Organic Silicon (wt%) | Amount of contained *2)Silica (wt%) | Frictional resistance | Rockwell hardness | Heiz-value after the scratch-test | Transmittance (%) |
|---|---|---|---|---|---|---|
| 1 | 0 | 0 | △ | 100 | 0.5 | △ | 93 |
| 2 | 5 | 5 | ○ | 103 | 0.3 | ○ | 92 |
| 3 | | 10 | ○ | 106 | 0.3 | ○ | 92 |
| 4 | | 15 | ○ | 112 | 0.3 | ○ | 92 |
| 5 | 10 | 5 | ○ | 103 | 0.3 | ○ | 92 |
| 6 | | 10 | ○ | 105 | 0.3 | ○ | 92 |
| 7 | | 15 | ○ | 107 | 0.3 | ○ | 92 |
| 8 | 30 | 5 | ○ | 90 | 0.5 | △ | 90 |
| 9 | | 10 | ○ | 95 | 0.5 | △ | 90 |
| 10 | | 15 | ○ | 98 | 0.5 | △ | 90 |

○ : Good   △ : Not good

*1) single side end-double bond type
*2) having the acrylate group on the surface

FIG.14

Table 10

| Sample No. | Amount of contained *1)Organic Silicon (wt%) | Amount of contained *2)Silica (wt%) | Frictional resistance | Rockwell hardness | Heiz-value after the scratch-test | Transmittance (%) |
|---|---|---|---|---|---|---|
| 1 | 0 | 0 | △ | 100 | ○ | △ | 0.5 | ○ | 93 |
| 2 | | 5 | ○ | 103 | ○ | 0.3 | ○ | 92 |
| 3 | 5 | 10 | ○ | 106 | ○ | 0.3 | ○ | 92 |
| 4 | | 15 | ○ | 112 | ○ | 0.3 | ○ | 92 |
| 5 | | 5 | ○ | 103 | ○ | 0.3 | ○ | 92 |
| 6 | 10 | 10 | ○ | 104 | ○ | 0.3 | ○ | 92 |
| 7 | | 15 | ○ | 106 | ○ | 0.3 | ○ | 92 |
| 8 | | 5 | ○ | 90 | △ | 0.5 | △ | 90 |
| 9 | 30 | 10 | ○ | 94 | △ | 0.5 | △ | 90 |
| 10 | | 15 | ○ | 96 | △ | 0.5 | △ | 90 |

○ : Good   △ : Not good

*1) both side ends-double bond type
*2) having the acrylate group on the surface

FIG.15

Table 11

| Sample No. | Amount of contained *1)Organic Silicon (wt%) | Amount of contained *2)Silica (wt%) | Frictional resistance | Rockwell hardness | Heiz-value after the scratch-test | Transmittance (%) |
|---|---|---|---|---|---|---|
| 1 | 0 | 0 | △ | 100 | 0.5 | ○ 93 |
| 2 | 5 | 5 | ○ | 103 | 0.3 | ○ 92 |
| 3 | 5 | 10 | ○ | 104 | 0.3 | ○ 92 |
| 4 | 5 | 15 | ○ | 110 | 0.3 | ○ 92 |
| 5 | 10 | 5 | ○ | 103 | 0.3 | ○ 92 |
| 6 | 10 | 10 | ○ | 104 | 0.3 | ○ 92 |
| 7 | 10 | 15 | ○ | 106 | 0.3 | ○ 92 |
| 8 | 30 | 5 | ○ | 90 | 0.5 | △ 90 |
| 9 | 30 | 10 | ○ | 93 | 0.5 | △ 90 |
| 10 | 30 | 15 | ○ | 95 | 0.5 | △ 90 |

○ : Good  △ : Not good

*1) single side end-hydroxyle group type
*2) having the acrylate group on the surface

FIG.16

Table. 12

| Example No. | Short-circuit current | | Conversion efficiency |
|---|---|---|---|
| | Initial value | Value after test | |
| Example 12 | 30.1 | 27.2 | 90% |
| Example 13 | 29.8 | 27.1 | 91% |
| Example 14 | 28.4 | 25.8 | 91% |
| Comparative Example | 30.8 | 22.3 | 72% |

ACRYLIC RESIN COMPOSITION, PAINTED-FILM MOLDED RESIN PLATE USING THE SAME, AND COATING MEMBER FOR SOLAR CELL PANEL

BACKGROUND OF THE INVENTION

1. Field of the Invention

The present invention relates to an acrylic resin composition and a painted-film molded resin plate using the same. In particular, the acrylic resin composition and their moldings have applications as a coating member for the body of the car, exterior car body parts, internal car body parts, etc. and a coating member for the solar cell panel.

2. Description of the Related Art

The body panel that occupies most of the external shape of the car is the important parts in appearance up to now. The resin body panel has good moldability and has the larger margin in shape than the steel plate. Also, there are social demands such as energy conservation, reduction in weight, improvement in safety, etc. In recent years, the use of the resin body plate is increased under these circumstances.

In addition, the coating member of the solar cell is required to have many properties such as transparency, weather resistance, moisture resistance, rigidity, etc. The transparent resin material represented by the glass and the fluororesin is often employed to attain such demands. More particularly, the transparent resin material is excellent in the flexibility and the impact resistance rather than the glass, and can extremely reduce the weight. Thus, there is such a tendency that the transparent resin material is employed more and more in recent years.

SUMMARY OF THE INVENTION

Since the appearance quality is important to the car body plate, it is the main current that the painting is carried out by the high-temperature baking at the same time as the steel plate. Therefore, the painting equipment for the car body plate is needed in manufacturing the car body plate and thus a large investment is needed.

Also, if the resin body panel is recycled, the step of peeling off the painted film that is cured by the heating is needed. A large investment in this step is also needed.

Recently, in order to overcome the above problem, the colored film, i.e., the painted-film is employed in place of the baking painting. These films are employed in the side molding, etc. of a part of cars.

However, when the car is washed by the automatic car washing apparatus provided to the gasoline station, etc., the surface of the painted-film is scratched by the brush of the car washing apparatus used and the dust, etc. on the car body panel. In these painted-films, the scratches are detected by the naked eye with the increase of the frequency in the use of the car washing apparatus to thus cause the displeasure in appearance.

The painted-film has a colored layer and a clear layer formed on the colored layer. In general, the thermoplastic acrylic resin is employed as this clear layer. In order to improve the scratch resistance of this acrylic resin, the improvement to increase the glass transition temperature of the acrylic resin, the method of mixing the fluororesin thereinto, or the like have been tried.

In Japanese Laid-Open Patent Publications (KOKAI) Sho 63-123469 (published in 1988) and Sho 63-120640 (published in 1988), the alloy of the poly (vinylidene fluoride)/acryl is disclosed. Also, in Japanese Laid-Open Patent Publication (KOHYO) Hei 02-503077(published in 1990), the clear layer made of the alloy consisting of fluorinated polymer (poly(vinylidene fluoride)) of less than 70 wt % and the acrylic resin of less than about 50 wt % is disclosed.

However, even if these improving methods are applied, it is impossible to eliminate completely the scratch of the painted-film in washing the car. In the existing painted-films, the scratches can be visually found with the increase of the frequency in the use of the car washing apparatus to thus cause the displeasure in appearance. Especially, the existing painted-films do not arrive at the level to satisfy the performances required for the body panel such as the fender, etc.

The trial to improve the frictional resistance, the hardness, and the scratch resistance of the painted-film by mixing fine grains of the transparent inorganic compound into the acrylic resin has been carried out. But it is impossible to achieve the sufficient improvement of them by dispersing/mixing the fine grains simply.

Also, since the transparent resin material used as the coating member for the solar cell in the prior art is insufficient in the scratch resistance, the problem of scratch due to the long-term use and the cleaning is caused. The increase in scratches on the surface reduces the light transmittance. Since these scratches increase the frequency of the attachment of dirt, they cause the extreme reduction in the conversion efficiency of the solar cell. Also, the scratches formed on the transparent resin material degrade the fine view in appearance of the solar cell. In addition, if the scratches are formed on the above transparent resin material, the contamination such as the dust and the oil content in the air are ready to adhere onto the material, but it is difficult to remove such attached dirt.

It is an object of the present invention to provide an acrylic resin composition with the high scratch resistance, which is possible to be used as the clear layer of the painted-film and the coating member for the solar cell panel.

Also, it is another object of the present invention to provide a painted-film molded resin plate and the coating member for the solar cell panel using the same.

An acrylic resin composition of the present invention is characterized in that an organic silicon based compound that is able to be copolymerised with or mixed with the acryl monomer or the methacryl monomer is contained in the acrylic resin composition.

As the organic silicon based compound, there may be listed the organic silicon based compound which has the hydroxyl group at a single end of polymer compound or has the organic silicon based compound which has the double bond at a single side end or both side ends.

Also, a painted-film of the present invention is characterized in that it has the above acrylic resin composition as a clear layer.

In addition, a coating member for the solar cell panel of the present invention is characterized in that it is coated on the light receiving surface of the solar cell and has the above acrylic resin composition of the present invention as the clear layer.

According to the acrylic resin composition of the present invention, the scratch resistance is improved. Therefore, since the painted-film and the coating member for the solar cell panel using this acrylic resin composition as the clear layer suppresses generation of the scratch due to the long-term use, the adhesion of the dirt can be reduced, the damage in appearance can be prevented, and the high transmittance can be maintained.

BRIEF DESCRIPTION OF THE DRAWINGS

FIGS. 5 to 15 are Tables showing characteristics of the acrylic resin composition according to Example 1 to Example 11 respectively; and FIG. 16 is a Table showing characteristics of a solar cell panel according to Example 12, Example 13, and Example 14 and Comparative Example respectively.

DETAILED DESCRIPTION OF THE EMBODIMENTS

<Acrylic Resin Composition>

Figure 1A:
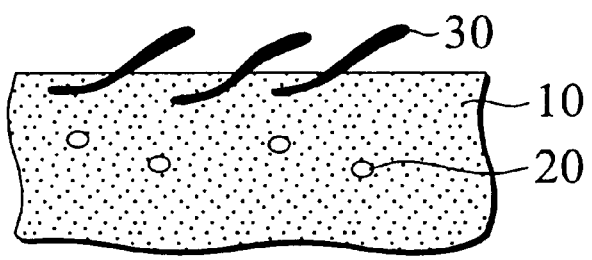
FIG. 1A is a schematic view showing an acrylic resin composition containing organic silicon having a double bond at a single side end and silica fine grains, according to an embodiment of the present invention.

An acrylic resin composition according to an embodiment of the present invention will be explained in detail hereunder.

The acrylic resin composition according to the embodiment of the present invention comprises an organic silicon based compound. The organic silicon based compound is copolymerised with or mixed with acryl monomer or methacryl monomer. Thus, the friction characteristic of the acrylic resin can be improved by causing the organic silicon based compound to contain in the acryl upon synthesizing the acrylic resin composition.

As the above organic silicon based compound that can be copolymerised with the acryl monomer or the methacryl monomer, the organic silicon based compound having a double bond at a single side end is preferable. The organic silicon based compound is expressed by the following Chemical Formula (1).

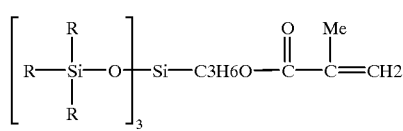

(1)

(where R is an alkyl group ($C_nH_{2n+1}$) and Me is a methyl group ($CH_3$) in Chemical Formula (1)).

The above organic silicon based compound expressed by above Chemical Formula (1) is the single side end-double bond type compound having the reactivity. Particularly, for example, if the alkyl group (R) is the methyl group, a 3-methacryloxypropyltris(trimethylsiloxy)silane is obtained.

Also, the particular example of other single side end-double bond type compound may be the organic silicon based compound that is expressed by the following Chemical Formula (2).

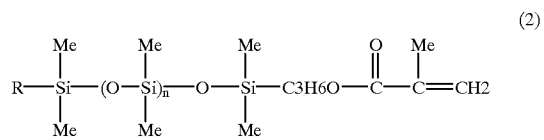

(2)

(where R is the alkyl group and Me is the methyl group in Chemical Formula (2)).

For example, if the alkyl group (R) is n-butyl, an α-butyl-ω-(3-methacryloxypropyl)polydimethylsiloxane is obtained.

Also, as the above organic silicon based compound that can be copolymerised with other acryl monomer or other methacryl monomer, there may be the organic silicon based compound having a double bond at both side ends. It is expressed by the following Chemical Formula (3).

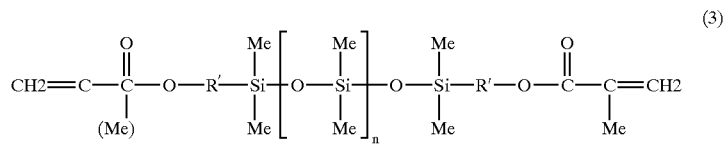

(3)

(where R' is the alkylene group ($C_nH_{2n}$) and Me is the methyl group in Chemical Formula (3)).

The above organic silicon based compound expressed by above Chemical Formula (3) is the both side ends-double bond type compound having the reactivity. For example, if the above alkyl group is the methyl group, an α, ω-(3-methacryloxypropyl)polydimethylsiloxane is obtained. This molecular structure may be expressed by the following Chemical Formula (4).

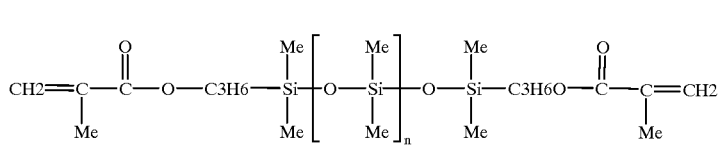

(4)

(where Me is the methyl group in Chemical Formula (4)).

By adding these organic silicon based compounds into the acrylic resin in the polymerization process, they are copolymerized with the acrylic resin. Thus, the friction characteristic of the acrylic resin can be improved and also the scratch property can be improved.

Further, it is preferable that the organic silicon based compound expressed by above Chemical Formula (3) should have 'n'=8 to 130 and a number-average molecular weight of 1000 to 10000.

The film becomes too hard and is brittle if 'n' is less than 8, whereas the film becomes too elastic and is easily scratched if 'n' exceeds 130. Similarly, the film becomes too hard and is brittle if the number-average molecular weight is less than 1000, whereas the film becomes too elastic and is easily scratched if the number-average molecular weight is in excess of 10000.

As the above organic silicon based compound that can be copolymerised with other acryl monomer or other methacryl monomer, there may be the organic silicon based compound having the double bond at both side ends. It is expressed by the following Chemical Formula (5).

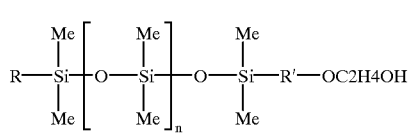

(5)

(where R is the alkyl group, R' is the alkylene group, and Me is the methyl group in Chemical Formula (5)).

The above organic silicon based compound expressed by above Chemical Formula (5) is the single side end-hydroxyl group type compound having the reactivity. For example, if the alkyl group (R) is the methyl group, an α-(3-(2'-hydroxyethoxy)propyl)polydimethylsiloxane is obtained. This molecular structure may be expressed by the following Chemical Formula (6).

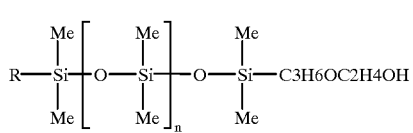

(6)

(where R is the alkyl group and Me is the methyl group in Chemical Formula (6)).

If this is mixed at the time when the acrylic resin is synthesized, the friction characteristic of the acrylic resin can be improved and also the scratch property can be improved.

Also, it is preferable that the organic silicon based compound expressed by above Chemical Formula (5) should have 'n' that is more than or equal to 10 and less than or equal to 130 and the number-average molecular weight that is more than 1000 and less than or equal to 10000.

The organic silicon based compound is melt away from a surface of the film if 'n' is below 10, whereas the film becomes too elastic and is easily scratched if n exceeds 130. Similarly, the organic silicon based compound is melt away from the surface of the film if the number-average molecular weight is less than 1000, whereas the film becomes too elastic and is easily scratched if the number-average molecular weight is more than 10000.

In addition, it is preferable that a copolymerization or mixing ratio of the above organic silicon based compound expressed by above Chemical Formula (1), (3), or (5) should be set more than or equal to 1 wt % and less than or equal to 30 wt % with respect to the acryl monomer. Further, it is more preferable that the ratio should be set to more than 1 wt % and less than 10 wt %.

The effect is small if the ratio is below 1 wt % whereas the film becomes too elastic and is easily scratched if the ratio is more than 30 wt %. Also, the reasons for that it is more preferable that the ratio should be set less than or equal to 10 wt % are that the hardness of the film and the scratch resistance are good.

Also, in order to increase the surface hardness of the acrylic resin composition, it is effective to disperse/mix fine grains into the resin in the process of polymerization of the acrylic resin. To maintain the transparency of the acrylic resin composition, the diameter of the grains should be set less than 380 nm, which is almost the shortest wavelength of the visible light. For example, silica, titania, or zirconia which is transparent inorganic may be listed as such fine grain. Any one of the spherical shape, the plate shape, and the needle shape may be selected as the shape of the inorganic fine grains. Particularly, the fine grains having the diameter of 5 nm to 20 nm can provide good dispersibility to achieve the composition in the order of nanometer. However, it is difficult to get the sufficiently satisfactory surface hardness by simply dispersing/mixing these inorganic fine grains into the resin in the process of synthesis of the acrylic resin.

It is preferable that, in order to improve the frictional resistance, the hardness, and the scratch resistance of the acrylic resin composition much more, the bonding strength at the interface between the above inorganic fine grains and the acrylic resin should be increased further more. It is also preferable that, in order to increase the bonding strength at the interface between the above inorganic fine grains and the acrylic resin, the hydroxyl group or the methyl group should be bonded to the surfaces of the inorganic fine grains, for example. Preferably, the silica fine grains may be employed as the inorganic fine grains and then the hydroxyl group or the methyl group may be bonded to the surfaces of the silica fine grains. These silica fine grains have the interaction with the acrylic resin and thus are effective to improve the surface hardness.

As the particular example of the above silica fine grains, there may be listed the silanol group ($\equiv$Si—OH) type (AEROSIL 300, grain diameter 7 nm: manufactured by Nihon Aerosil) in which the hydroxyl group is bonded to the surface of silica.

If the silica fine grains and the titanium-based coupling agent (titanium triacrylate isopropoxide ATK 877: Chisso Corporation) having the acrylate at an end are reacted with each other at one stage without the hydrolysis, the acrylate group can be chemically bonded to the surfaces of the above silica fine grains. The titanium-based coupling agent is expressed by the following Chemical Formula (7).

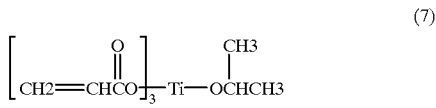
(7)

This reaction is given by the following Formula (8).

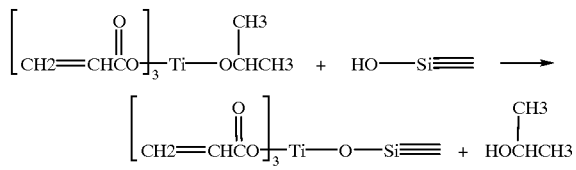
(8)

Also, the compound in which the end acrylate group is bonded to the surfaces of the silica fine grains can be expressed by the following Chemical Formula (9).

(9)

Since the above acrylate group bonded to the surfaces of the silica fine grains reacts with the acryl monomer or the methacryl monomer, the acryl polymer can be bonded to the surface of silica. This reaction is given by the following Reaction Formula (10).

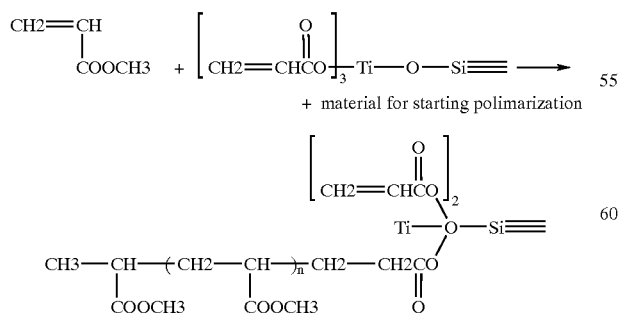
(10)

In this case, the above reactions are explained in Press Information entitled "Introduction to Epoxy Resin" (Muroi and Ishii, P129, Polymer Publishing Association) and Bulletin of Kenrich Co. (No. Kr-0975-2).

If the polymer obtained by the reaction expressed by Reaction Formula (10) is melt-mixed or solution-mixed into the resin at the time of synthesis of the acrylic resin, the surface hardness of the acrylic resin composition can be increased.

In addition, if the organic silicon based compound having the reactivity is bonded to the silica fine grains having the end acrylate group on the surface and then they are mixed into the acrylic resin, the breaking strength and the stiffness of the acrylic resin composition can be improved.

In other words, in the process of polymerization of the acrylic resin, if the 3-methacryloxypropyltris(trimethylsiloxy)silane which is the single side end-double bond type compound, as described above as the particular example of the organic silicon based compound having the reactivity, or the α-butyl-ω-(3-methacryloxypropyl)polydimethylsiloxane is caused to react with the silica fine grains, to surfaces of which the end acrylate group is bonded, compounds expressed respectively by the following Chemical Formulas (11)(12).

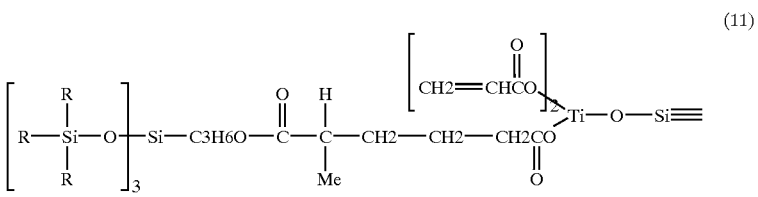
(11)

(where R is the alkyl group and Me is the methyl group in Chemical Formula (11))

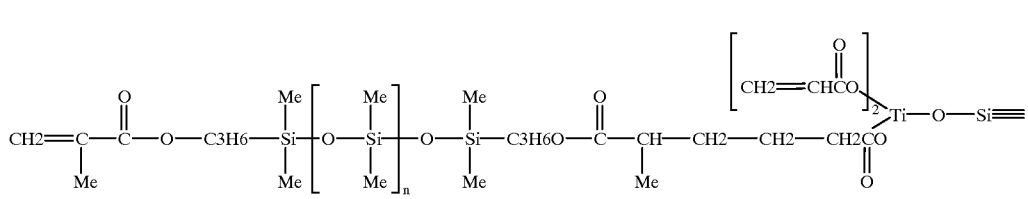

(where Me is the methyl group in Chemical Formula (12))

If the compound obtained by Formula (11) or Formula (12) is copolymerized with the acryl, the breaking strength and the stiffness of the acrylic resin can be improved and also the scratch property can be improved by improving the friction characteristic.

Further, in the polymerization process of the acrylic resin, if the single side end-hydroxyl group type (α-(3-(2'-hydroxyethoxy)propyl) polydimethylsiloxane) described above as the particular example of the organic silicon based compound is mixed with the silica fine grains having the end acrylate group on the surface, and then they are mixed with the acryl, similarly the breaking strength and the stiffness of the acrylic resin can be improved and also the scratch resistance can be increased by improving the friction characteristic. The α-(3-(2'-hydroxyethoxy) propyl) polydimethylsiloxane is expressed by the following Chemical Formula (13).

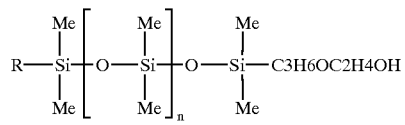

(where R is the alkyl group and Me is the methyl group in Chemical Formula (13))

Any of the suspension polymerization, the solution polymerization, the emulsion polymerization, and the bulk polymerization may be applied as the polymerization reaction between the acrylic resin and the organic silicon based compound.

Figure 1B:
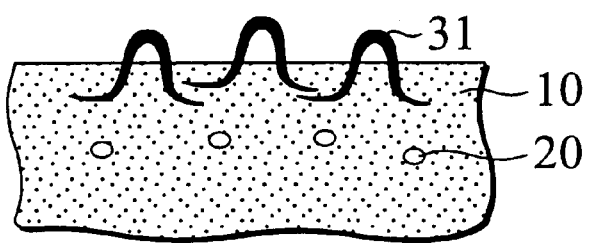
FIG. 1B is a schematic view showing an acrylic resin composition containing organic silicon having a double bond at both side ends and the silica fine grains, according to the embodiment of the present invention.
Figure 1C:
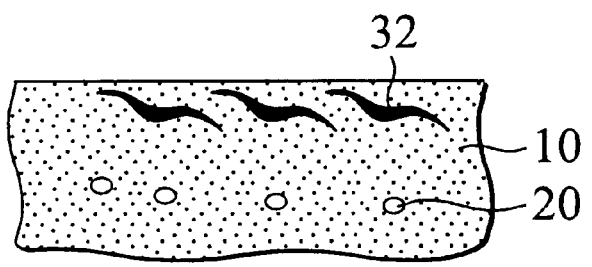
FIG. 1C is a schematic view showing an acrylic resin composition containing organic silicon having a hydroxyl group at a single side end and the silica fine grains, according to the embodiment of the present invention.

FIGS. 1A to 1C are schematic views showing the acrylic resin composition in which the silicon-based compound and the silica fine grains are polymerized with each other according to the above embodiment of the present invention.

FIG. 1A shows an acrylic resin composition 10 which contains a silicon-based compound 30 given by the molecular formula that has the double bond at a single end and silica fine grains 20 which have the hydroxyl group on their surfaces. The silicon-based compound 30 is polymerized with the acryl monomer or the methacryl monomer at a single end of the molecular having the reactivity to bond firmly to the acrylic resin composition 10. Also, the silica fine grains that are contained in the acrylic resin composition 10 are chemically bonded to the acrylic resin 10 by the hydroxyl group on the surface to increase the strength of the acrylic resin composition 10.

FIG. 1B shows the acrylic resin composition 10 which contains a silicon-based compound 31 given by the molecular formula that has the double bond at both side ends and silica fine grains 20 which have the hydroxyl group on their surfaces. The silicon-based compound 31 is polymerized with the acryl monomer or the methacryl monomer at both ends of the molecular having the reactivity to bond firmly to the acrylic resin composition 10.

FIG. 1C shows the acrylic resin composition 10 which contains a silicon-based compound 32 given by the molecular formula that has the hydroxyl group at a single end and the silica fine grains 20 which have the hydroxyl group on their surfaces. Since the silicon-based compound 32 is mixed with the acryl monomer or the methacryl monomer, it is buried into the acrylic resin composition 10.

Painted-Film Molded Resin Plate

Next, a painted-film molded resin plate using the acrylic resin composition according to the present invention will be explained hereunder.

Since the above acrylic resin composition is transparent, it can be utilized as the clear layer of the painted-film of the car body panel, for example. If the acrylic resin composition is coated on the colored layer, such acrylic resin composition does not lower the light transmittance of the transparent resin, nevertheless the gloss, the frictional resistance, the scratch property, and the surface hardness of the resin plate on which the acrylic resin composition is coated can be improved.

Figure 2:
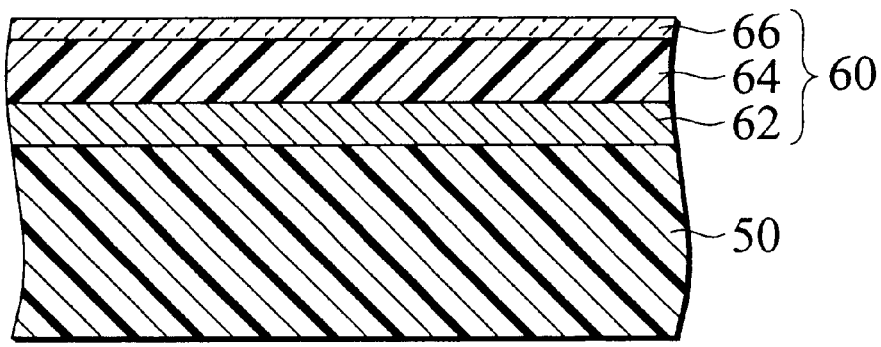
FIG. 2 is a sectional view showing a sectional structure of a painted-film molded resin plate according to the embodiment of the present invention.

FIG. 2 shows an example of the painted-film molded resin plate according to the embodiment. This painted-film molded resin plate is constructed by laminating and a resin base material and the painted-film which has the acrylic resin composition according to the above embodiment as the clear layer. Also, this painted-film molded resin plate may be constructed by forming them integrally by the insert molding.

For example, as shown in FIG. 2, a painted-film consisting of a laminated film of a backing layer 62, the colored layer 64, and a clear layer 66 is formed on a resin forming plate 50 as the resin base material. Both the colored layer 64 and the clear layer 66 have the acryl resin as the base material, and the clear layer 66 corresponds to the acrylic resin composition according to the above embodiment.

The layer built painted-film may be formed by virtue of the fused multiplayer extrusion film molding or the thermally laminating molding. Also the layer built painted-film may be formed by laminating the clear layer, the colored film, and the backing material in sequence by virtue of the thermally laminating molding.

<Coating Member for Solar Cell Panel>

Next, an embodiment of a coating member for a solar cell panel using the acrylic resin composition according to the present invention will be explained hereunder.

FIGS. 3A to 3D show an example of a structure of the solar cell panel on which the coating member is formed, respectively.

The coating member for the solar cell panel is used by coating the acrylic resin composition according to the above embodiment as the clear layer on the light receiving surface side of the solar cell. Since the acrylic resin composition can improve the scratch resistance of the surface and the acrylic resin composition is excellent in the water repellent and the oil repellent, the scratch and the adhering dirt due to the long-term use can be reduced. Therefore reduction of transmittance is prevented, and the initial power generating efficiency can be maintained.

Figure 3A:
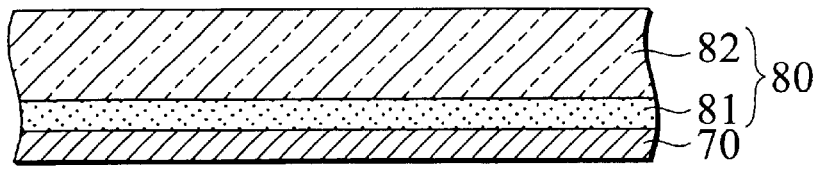
FIGS. 3A to 3D are sectional views showing a sectional structure of the solar cell panel according to the embodiment of the present invention respectively.
Figure 3B:
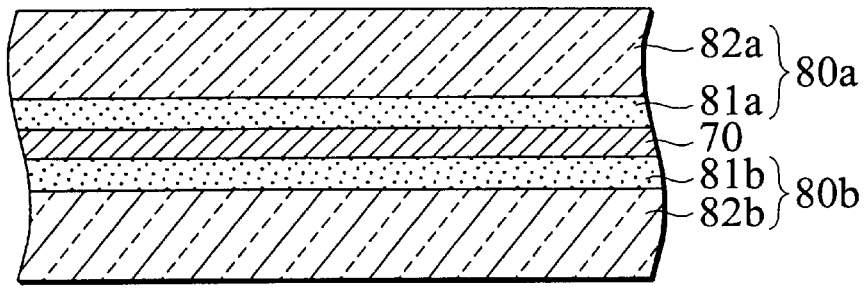

As shown in FIG. 3A, a coating member 80 for the solar cell panel achieves the above effect sufficiently if it covers a light receiving surface of the solar cell 70. However, as shown in FIG. 3B, coating members 80a, 80b may be coated on the light receiving surface and a back surface of the solar cell 70 respectively. That is, if the solar cell is buried in the above acrylic resin composition, the above-mentioned effect can be attained.

Figure 3C:
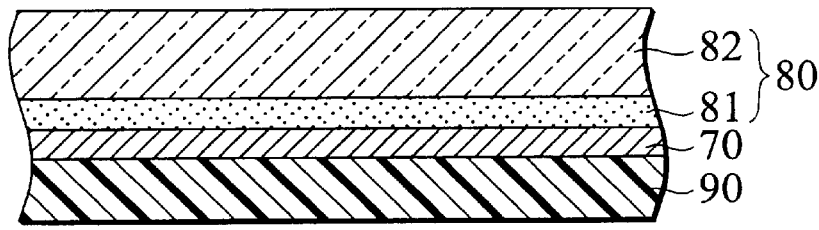

As shown in FIG. 3A, the solar cell 70 may be used as the exposed device, i.e., used in the form of the so-called cell. Otherwise, as shown in FIG. 3C, the solar cell 70 may be used by covering it by a supporting member 90 such as a PET film, an EVA sheet, etc., i.e., used in the form of the so-called module. The form of the solar cell is not particularly limited.

Preferably, the coating member 80 for the solar cell panel can be constructed by laminating an adhesive layer and/or an elastic layer 81, and a clear layer 82 made of the acrylic resin composition. In case the adhesive strength to the surface material of the solar cell is weak only by the clear layer 82, the adhesive layer can provide the sufficient exfoliation strength. Also, the destruction of the solar cell device caused by the thermal deformation stress due to difference in the coefficient of linear expansion between the above acrylic resin composition and the solar cell can be prevented by providing the elastic layer.

As the above adhesive layer, polyurethane-based, epoxy-based, silicon-based, and acryl-based adhesives, for example, are listed, and any one of them may be selected appropriately to fit for the material of the adhered surface.

As the above elastic layer, acrylic rubber, silicone rubber, urethane rubber, ethylene vinylacetate, polyvinyl butyral, and various thermoplastic elastomers, for example, are listed, and any one of the elastic layers which have lower elasticity than the above acrylic resin composition may be selected appropriately.

Figure 3D:
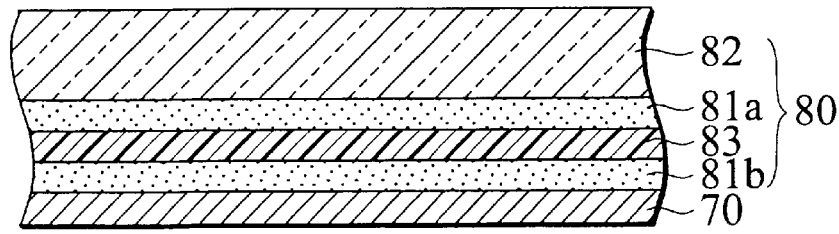

In addition, as shown in FIG. 3D, for example, a plurality of layers such as an adhesive layer 81a, an elastic layer 83, and an adhesive layer 81b may be laminated duplicately in this order between the clear layer 82 and the solar cell 70.

In order to cover the above acrylic resin composition on the light receiving surface of the solar cell as the clear layer, it is preferable that the acrylic resin composition should be formed like a film or a sheet, and then be coated directly on the light receiving surface of the solar cell or be laminated via the adhesive layer and/or the elastic layer.

As the particular method, there may be listed so-called thermal laminating process in which the film or sheet of the acrylic resin composition is covered directly on the light receiving surface of the solar cell or is covered via the adhesive layer and/or the elastic layer and then is press-fitted by the press or the roll while applying the heat.

The film or sheet may be covered only on the light receiving surface side of the solar cell, otherwise the solar cell may be put between two sheets of film or sheet.

Also, as other covering method, the solar cell is placed in the mold, and then the light receiving surface side of the solar cell may be coated by filling the acrylic resin composition into the mold. In addition, the solar cell is placed in the mold after the adhesive layer and/or the elastic layer are laminated on the light receiving surface side of the solar cell, and then the acrylic resin composition may be filled into the mold.

As the concrete method, there may be listed the so-called insert molding process. In this method, the solar cell is placed such that a back surface of the solar cell comes into contact with a core surface of the mold, then the molds are clamped, and then the melted acrylic resin composition is injected into the mold to fill it. The powers of the acrylic resin composition which are an almost spherical shape having an average grain diameter of 1 to 100 μm may be filled into the mold in place of the melted acrylic resin composition, and then the overall mold may be heated up to the melting temperature and then cooled. In this case, if the solar cell is fixed in the hanging state not to contact to the mold, such solar cell can be buried in the acrylic resin composition.

Figure 4:
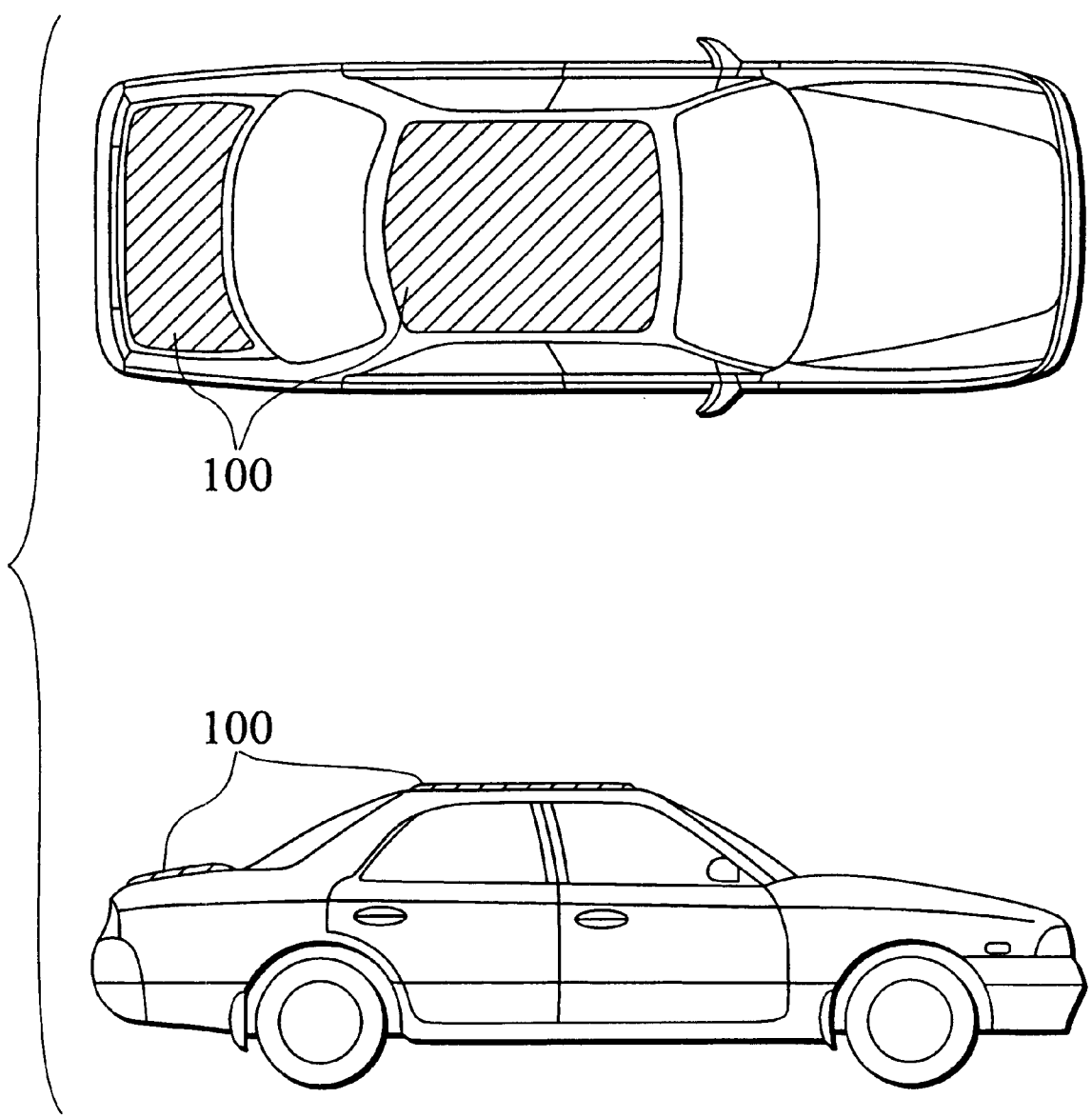
FIG. 4 is a view showing an appearance of the car into which the solar cell panels are installed.

FIG. 4 is a view showing an example of an appearance of the car into which solar cell panels 100 according to the present invention are installed. The place on which the solar cell panels 100 are installed is not particularly limited, and any place may be selected if such place can be irradiated by the outer light. For example, as shown in FIG. 4, preferably the solar cell panel may be installed on the rear body or the roof panel. Also, irrespective of the presence of the solar cell panel, the painted-film according to the present embodiment may be used on the surface of the car body as the coating member.

As described above, if the acrylic resin composition according to the present embodiment is used as the clear layer of the painted-film molded resin plate or as the coating member for the solar cell panel, not only the gloss, the frictional resistance, and the surface hardness are improved but also the scratch resistance can be increased. In addition, the frequency of adhering dirt on the scratches can be reduced, and the dirt can be easily removed even if such dirt is adhered. In particular, the antifouling property can be improved because of the water repellency and the oil repellency of the acrylic resin composition, into which the above organic silicon-based compound is mixed, regardless of the presence of the scratches.

EXAMPLES

The present invention will be explained in more detail with reference to Examples and Comparative Example hereunder, but the present invention is not limited to these examples.

[Evaluation Method of the Acrylic Resin Composition]

The frictional resistance, i.e., the degree of the slippiness, of the acrylic resin composition was measured by using the surface property measuring apparatus (HEIDEN 14DR manufactured by Shinto Kagaku Co., Ltd.). The horizontal movement starting force was measured by dropping the dust (JIS No. 8) 23 wt % aqueous solution on the cotton cloth having a constant area on the test piece by 1 cc, and then applying the constant load onto the cotton cloth. Then, the friction characteristic was evaluated according to the magnitude of a horizontal movement starting force based on the relative value while relatively comparing with the existing acrylic resin.

The scratch property, i.e., the degree of the difficulty to be scratched by the friction, of the acrylic resin composition was measured by using the surface property measuring apparatus (HEIDEN 14DR manufactured by Shinto Kagaku Co., Ltd.). After the dust (JIS No. 8) 23 wt % aqueous solution is dropped onto a constant area on the test piece by 1 cc and then the test piece is moved repeatedly by the predetermined number of times at a constant speed while applying a constant load thereto, Heiz values of the test piece after the friction were measured by the Heiz meter (HM-65 manufactured by the Murakami Color Research Institute). Then, the abrasion property was evaluated according to the magnitude of the Heiz value based on the relative value while relatively comparing with the existing acrylic resin.

The hardness of the acrylic resin composition was evaluated by using the Rockwell hardness meter (M scale) based on the relative values while relatively comparing with the existing acrylic resin.

Also, the transparency was evaluated by detecting the total light transmittance by using the Heiz meter (HM-65 manufactured by the Murakami Color Research Institute) based on the relative value while relatively comparing with the existing acrylic resin.

Example 1

The methyl methacrylate and the benzoyl peroxide were mixed at a rate of 100/0.5 and then heated up to 90° C. Then, the polymerization reaction was caused by dropping gradually the single side end-double bond type organic silicon (CYLAPLANE TM-0701 manufactured by Chisso Corporation). Then, they were precipitated by using the coagulating solvent ethanol after about one hour lapsed. According to this method, the compounds whose composition ratio of the acryl resin/the single side end-double bond type organic silicon was 99/1, 95/5, and 90/10 respectively were prepared.

In addition, according to the same method, the compounds whose composition ratio of the acryl resin/the single side end-double bond type organic silicon was 70/30, and 60/40 respectively were prepared.

Five types of test pieces having different composition ratios were prepared by drying these resultant resin compositions and then applying the thermal press formation.

Respective data of the frictional resistance, the hardness, the scratch property, and the transparency of these test pieces are given in Table 1 of FIG. 5 while comparing them with the acrylic resin composition in the prior art into which the organic silicon is not added.

As shown in Table 1 of FIG. 5, under the conditions that an amount of contained organic silicon of the single side end-double bond type is below 30 wt %, the acrylic resin compositions have the good transparency and are superior in the frictional resistance, the hardness, and the scratch property to the acrylic resin only in the prior art.

Example 2

The methyl methacrylate and the benzoyl peroxide were mixed at a rate of 100/0.5 and then heated up to 90° C. Then, the polymerization reaction was caused by dropping gradually the both side ends-double bond type organic silicon (CYLAPLANE FM-7711 manufactured by Chisso Corporation). Then, they were precipitated by using the coagulating solvent ethanol after about one hour lapsed. According to this method, the compounds whose composition ratio of the acryl resin/the both side ends-double bond type organic silicon was 99/1, 95/5, and 90/10 respectively were prepared.

In addition, according to the same method, the compounds whose composition ratio of the acryl resin/the both side ends-double bond type organic silicon was 70/30, and 60/40 respectively were prepared.

Five types of test pieces having different composition ratios were prepared by drying these resultant resin compositions and then applying the thermal press formation.

Respective data of the frictional resistance, the hardness, the scratch property, and the transparency of these test pieces are given in Table 2 of FIG. 6 while comparing them with the acrylic resin composition in the prior art into which the organic silicon is not added.

As shown in Table 2 of FIG. 6, under the conditions that an amount of contained organic silicon of the both side ends-double bond type is below 30 wt %, the acrylic resin compositions have the good transparency and are superior in the frictional resistance, the hardness, and the scratch property to the acrylic resin only in the prior art.

Example 3

The methyl methacrylate and the benzoyl peroxide were mixed at a rate of 100/0.5 and then heated up to 90° C. Then, the polymerization reaction was caused by dropping gradually the single side end-hydroxyl group type organic silicon (CYLAPLANE FM-0411 manufactured by Chisso Corporation). Then, they were precipitated by using the coagulating solvent ethanol after about one hour lapsed. According to this method, the compounds whose composition ratio of the acryl resin/the single side end-hydroxyl group type organic silicon was 99/1, 95/5, and 90/10 respectively were prepared.

In addition, according to the same method, the compounds whose composition ratio of the acryl resin/the single side end-hydroxyl group type organic silicon was 70/30, and 60/40 respectively were prepared.

Five types of test pieces having different composition ratios were prepared by drying these resultant resin compositions and then applying the thermal press formation.

Respective data of the frictional resistance, the hardness, the scratch property, and the transparency of these test pieces are given in Table 3 of FIG. 7 while comparing them with the acrylic resin composition in the prior art into which the organic silicon is not added.

As shown in Table 3 of FIG. 7, under the conditions that an amount of contained organic silicon of the single side end-hydroxyl group type is below 30 wt %, the acrylic resin compositions have the good transparency and are superior in the frictional resistance, the hardness, and the scratch property to the acrylic resin only in the prior art.

Example 4

The methyl methacrylate and the benzoyl peroxide were mixed at a rate of 100/0.5 and then heated up to 90° C. Then, the polymerization reaction was caused little by little as a whole by dropping gradually the single side end-double bond type organic silicon (CYLAPLANE TM-0701 manufactured by Chisso Corporation) and also dropping gradually the silica fine grains (SNOW TEX MEK-ST manufactured by Nissan Chemical Industries, Ltd.) that are dispersed into the methylethylketone solvent to have a grain diameter of 10 to 20 nm. Then, they were precipitated by using the coagulating solvent ethanol after about one hour lapsed. According to this method, the compounds whose composition ratio of the acryl resin/the single side end-double bond type organic silicon/the silica fine grains was 90/5/5, 85/5/10, 80/5/15, 85/10/5, 80/10/10, and 75/10/15 respectively were prepared.

In addition, according to the same method, the compounds whose composition ratio of the acryl resin/the single side end-double bond type organic silicon/silica fine grains was 65/30/5, 60/30/10 and 55/30/15 respectively were prepared.

Nine types of test pieces having different composition ratios were prepared by drying these resultant resin compositions and then applying the thermal press formation.

Respective data of the frictional resistance, the hardness, the scratch property, and the transparency of these test pieces are given in Table 4 of FIG. 8 while comparing them with the acrylic resin composition in the prior art into which the organic silicon is not added.

As shown in Table 4 of FIG. 8, under the conditions that an amount of contained organic silicon of the single side end-hydroxyl group type is below 30 wt % and that an amount of contained silica fine grains is less than 15 wt %, the acrylic resin compositions have the good transparency and are superior in the frictional resistance, the hardness, and the scratch property to the acrylic resin only in the prior art. Especially, the hardness can be improved by adding the silica fine grains.

Example 5

The methyl methacrylate and the benzoyl peroxide were mixed at a rate of 100/0.5 and then heated up to 90° C. Then, the polymerization reaction was caused little by little as a whole by dropping gradually the both side ends-double bond type organic silicon (CYLAPLANE FM-7711 manufactured by Chisso Corporation) and also dropping gradually the silica fine grains (SNOW TEX MEK-ST manufactured by Nissan Chemical Industries, Ltd.) that are dispersed into the methylethylketone solvent to have a grain diameter of 10 to 20 nm. Then, they were precipitated by using the coagulating solvent ethanol after about one hour lapsed. According to this method, the compounds whose composition ratio of the acryl resin/the both side ends-double bond type organic silicon/the silica fine grains was 90/5/5, 85/5/10, 80/5/15, 85/10/5, 80/10/10, and 75/10/15 respectively were prepared.

In addition, according to the same method, the compounds whose composition ratio of the acryl resin/the both side ends-double bond type organic silicon/the silica fine grains was 65/30/5, 60/30/10 and 55/30/15 respectively were prepared.

Nine types of test pieces having different composition ratios were prepared by drying these resultant resin compositions and then applying the thermal press formation.

Respective data of the frictional resistance, the hardness, the scratch property, and the transparency of these test pieces are given in Table 5 of FIG. 9 while comparing them with the acrylic resin composition in the prior art into which the organic silicon is not added.

As shown in Table 5 of FIG. 9, under the conditions that an amount of contained organic silicon of the both side ends and double bond type is below 30 wt % and that an amount of contained silica fine grains is less than 15 wt %, the acrylic resin compositions have the good transparency and are superior in the frictional resistance, the hardness, and the scratch property to the acrylic resin only in the prior art. Especially, the hardness can be improved by adding the silica fine grains.

Example 6

The methyl methacrylate and the benzoyl peroxide were mixed at a rate of 100/0.5 and heated up to 90° C. Then, the polymerization reaction was caused little by little as a whole by dropping gradually the single side end-hydroxyl group type organic silicon (CYLAPLANE FM-0411 manufactured by Chisso Corporation) and also dropping gradually the silica fine grains (SNOW TEX MEK-ST manufactured by Nissan Chemical Industries, Ltd.) that are dispersed into the methylethylketone solvent to have a grain diameter of 10 to 20 nm. Then, they were precipitated by using the coagulating solvent ethanol after about one hour lapsed. According to this method, the compounds whose composition ratio of the acryl resin/the single side end-hydroxyl group type organic silicon/the silica fine grains was 90/5/5, 85/5/10, 80/5/15, 85/10/5, 80/10/10, and 75/10/15 respectively were prepared.

In addition, according to the same method, the compounds whose composition ratio of the acryl resin/the single side end-hydroxyl group type organic silicon/the silica fine grains was 65/30/5, 60/30/10 and 55/30/15 respectively were prepared.

Nine types of test pieces having different composition ratios were prepared by drying these resultant resin compositions and then applying the thermal press formation.

Respective data of the frictional resistance, the hardness, the scratch property, and the transparency of these test pieces are given in Table 6 of FIG. 10 while comparing them with the acrylic resin composition in the prior art.

As shown in Table 6 of FIG. 10, under the conditions that an amount of contained organic silicon of the single side end-hydroxyl group type is below 30 wt % and that an amount of contained silica fine grains is less than 15 wt %, the acrylic resin compositions have the good transparency and are superior in the frictional resistance, the hardness, and the scratch property to the acrylic resin only in the prior art. Especially, the hardness can be improved by adding the silica fine grains.

Example 7

The titanium-based coupling agent (titanium triacrylateisopropoxide (above Formula (7)) AKT877 (manufactured by Chisso Corporation)) was chemically reacted (above Formula (8)) with the silanol group (=Si—OH) type Silica (AEROSIL 300, grain diameter 7 nm (manufactured by Nihon Aerosil)) in which the hydroxyl group was bonded to the surface by the ordinary method to bond the acrylate group to the surface of the silica.

Next, the methyl methacrylate and the benzoyl peroxide were mixed at a rate of 100/0.5 and heated up to 90° C. Then, the polymerization reaction was caused by adding gradually the silica fine grains that are dispersed into the methylethylketone solvent to have the grain diameter of 7 nm and have the above end acrylate group. Then, they were precipitated by using the coagulating solvent ethanol after about one hour lapsed. According to this method, the compounds whose composition ratio of the acryl resin/the silica fine grains was 99/1, 95/5, and 90/10 respectively were prepared.

In addition, according to the same method, the compounds whose composition ratio of the acryl resin/the silica fine grains was 70/30 and 60/40 respectively were prepared.

Five types of test pieces having different composition ratios were prepared by drying these resultant resin compositions and then applying the thermal press formation.

Respective data of the frictional resistance, the hardness, the scratch property, and the transparency of these test pieces are given in Table 7 of FIG. 11 while comparing them with the acrylic resin composition in the prior art.

As shown in Table 7 of FIG. 11, the hardness can be improved by adding the silica fine grains that have the acrylate group via the hydroxyl group on the surface into the acrylic resin composition. Especially, under the conditions that an amount of contained silica fine grains is below 30 wt %, the acrylic resin compositions have the good transparency and are superior in the hardness and the scratch property to the acrylic resin only in the prior art.

Example 8

The methyl methacrylate and the benzoyl peroxide were mixed at a rate of 100/0.5 and heated up to 90° C. Then, the polymerization reaction was caused by adding gradually the silica fine grains (AEROSIL R812) that are dispersed into the ethyl ketone solvent to have the grain diameter of 7 nm and have the methyl group on their surfaces. Then, they were precipitated by using the coagulating solvent ethanol after about one hour lapsed. Thus, the compounds whose composition ratio of the acryl resin/the silica fine grains was 99/1, 95/5, and 90/10 respectively were prepared.

In addition, the compounds whose composition ratio of the acryl resin/the silica fine grains was 70/30 and 60/40 respectively were prepared.

Five types of test pieces having different composition ratios were prepared by drying these resultant resin compositions and then applying the thermal press formation.

Respective data of the hardness, the scratch property, and the transparency of these test pieces are given in Table 8 of FIG. 12 while comparing them with the acrylic resin composition in the prior art.

As shown in Table 8 of FIG. 12, the hardness was able to be improved by adding the silica fine grains that have the methyl group on the surface into the acrylic resin composition. Especially, under the conditions that an amount of contained silica fine grains is below 30 wt %, the acrylic resin compositions have the good transparency and are superior in the hardness and the scratch property to the acrylic resin only in the prior art.

Example 9

The methyl methacrylate and the benzoyl peroxide were mixed at a rate of 100/0.5 and heated up to 90° C. Then, the polymerization reaction was caused little by little as a whole by dropping gradually the organic silicon having the double bond at a single side end (CYLAPLANE TM-0701 manufactured by Chisso Corporation) and also dropping gradually the silica fine grains that are dispersed into the methylethylketone solvent to have a grain diameter of 7 nm and have the acrylate group on their surface. Then, they were precipitated by using the coagulating solvent ethanol after about one hour lapsed. According to this method, the compounds whose composition ratio of the acryl resin/the single side end-double bond type organic silicon/the silica fine grains was 90/5/5, 85/5/10, 80/5/15, 85/10/5, 80/10/10, and 75/10/15 respectively were prepared.

In addition, according to the same method, the compounds whose composition ratio of the acryl resin/the single side end-double bond type organic silicon/the silica fine grains was 65/30/5, 60/30/10 and 55/30/15 respectively were prepared.

Nine types of test pieces having different composition ratios were prepared by drying these resultant resin compositions and then applying the thermal press formation.

Respective data of the frictional resistance, the hardness, the scratch property, and the transparency of these test pieces are given in Table 9 of FIG. 13 while comparing them with the acrylic resin composition in the prior art.

As shown in Table 9 of FIG. 13, under the conditions that an amount of contained organic silicon having the double bond at the single side end is below 30 wt % and that an amount of contained silica fine grains having the acrylate group via the hydroxyl group on the surface is less than 15 wt %, the acrylic resin compositions have the good transparency and are superior in the frictional resistance, the hardness, and the scratch property to the acrylic resin only in the prior art.

Example 10

The methyl methacrylate and the benzoyl peroxide were mixed at a rate of 100/0.5 and heated up to 90° C. Then, the polymerization reaction was caused by dropping gradually the organic silicon having the double bond at both side ends (CYLAPLANE FM-7711 manufactured by Chisso Corporation) and at the same time by adding gradually the silica fine grains that were dispersed into the methylethylketone solvent to have a grain diameter of 7 nm and have the above end acrylate group. Then, they were precipitated by using the coagulating solvent ethanol after about one hour lapsed. According to this method, the compounds whose composition ratio of the acryl resin/the both side ends-double bond type organic silicon/the silica fine grains was 90/5/5, 85/5/10, 80/5/15, 85/10/5, 80/10/10, and 75/10/15 respectively were prepared.

In addition, according to the same method, the compounds whose composition ratio of the acryl resin/the both side ends-double bond type organic silicon/the silica fine grains was 65/30/5, 60/30/10 and 55/30/15 respectively were prepared.

Nine types of test pieces having different composition ratios were prepared by drying these resultant resin compositions and then applying the thermal press formation.

Respective data of the frictional resistance, the hardness, the scratch property, and the transparency of these test pieces are given in Table 10 of FIG. 14 while comparing them with the acrylic resin composition in the prior art.

As shown in Table 10 of FIG. 14, under the conditions that an amount of contained organic silicon having the double bond at both side ends is below 30 wt % and that an amount of contained silica fine grains having the acrylate group on the surface is less than 15 wt %, the acrylic resin compositions have the good transparency and are superior in the frictional resistance, the hardness, and the scratch property to the acrylic resin only in the prior art.

Example 11

The methyl methacrylate and the benzoyl peroxide were mixed at a rate of 100/0.5 and then heated up to 90° C. Then, the polymerization reaction was caused little by little as a whole by dropping gradually the single side end-hydroxyl group type organic silicon (CYLAPLANE FM-0411 manufactured by Chisso Corporation) and at the same time by adding gradually the silica fine grains that are dispersed into the methylethylketone solvent to have the grain diameter of 7 nm and have the acrylate group at the end. Then, they were precipitated by using the coagulating solvent ethanol after about one hour lapsed. According to this method, the compounds whose composition ratio of the acryl resin/the single side end-hydroxyl group type organic silicon/the silica fine grains was 90/5/5, 85/5/10, 80/5/15, 85/10/5, 80/10/10, and 75/10/15 respectively were prepared.

In addition, according to the same method, the compounds whose composition ratio of the acryl resin/the single side end-hydroxyl group type organic silicon/the silica fine grains was 65/30/5, 60/30/10 and 55/30/15 respectively were prepared.

Nine types of test pieces having different composition ratios were prepared by drying these resultant resin compositions and then applying the thermal press formation.

Respective data of the frictional resistance, the hardness, the scratch property, and the transparency of these test pieces are given in Table 11 of FIG. 15 while comparing them with the acrylic resin composition in the prior art.

As shown in Table 11 of FIG. 15, under the conditions that an amount of contained organic silicon having the hydroxyl group at a single side end is below 30 wt % and that an amount of contained silica fine grains having the acrylate group on the surface is less than 15 wt %, the acrylic resin compositions have the good transparency and are superior in the frictional resistance, the hardness, and the scratch property to the acrylic resin only in the prior art.

[Evaluation Method of the Coating Member for the Solar Cell Panel]

The evaluation of the scratch resistance/the antifouling property of the coating member for the solar cell panel was carried out in accordance with following procedures.

First, the short-circuit currents of the solar cell panel test pieces were measured by irradiating the light, that was equivalent to the light intensity AM 1.5, by the solar simulator. Such measured currents were set as the initial values of respective test pieces.

Then, the contaminated solution in which the powders, that are obtained by mixing sufficiently JIS test powder 12 type 50 wt % and JIS test powder 8 type 50 wt %, and the water are mixed at a rate of 1:1 was instilled to a constant area of the cotton cloth by 1 cc. Then, this cotton cloth was fitted to the surface property measuring apparatus (HEIDON 14DR manufactured by Shinto Kagaku Co., Ltd.) and then was slid on the test piece at a predetermined speed while applying the predetermined load thereto. After the cotton cloth to which the contaminated solution was instilled was replaced, another cotton cloth was similarly slid. The above operation was repeated by three cycles in total.

After the evaluation, the short-circuit currents were measured and reduction rates of the conversion efficiency were calculated by comparing with the initial values.

Example 12

The methyl methacrylate and the benzoyl peroxide were mixed at a rate of 100/0.5 and then heated up to 90° C. Then, the polymerization reaction was caused by dropping gradually the single side end-double bonds type organic silicon (CYLAPLANE TM-0701 manufactured by Chisso Corporation). Then, they were precipitated by using the coagulating solvent ethanol after about one hour lapsed. According to this method, the compounds whose composition ratio of the acryl resin/the single side end-double bond type organic silicon was 95/5 were prepared. The film-like moldings of the acrylic resin composition having a thickness of about 100 μm were obtained by drying these resultant resin compositions and then applying the thermal press formation to them.

Then, the test pieces of the solar cell panel were fabricated by laminating the film-like moldings on the light receiving surface of the amorphous silicon solar cell module fabricated on the polyimide base material, and then applying the thermal press molding to this laminated body.

Evaluation results of the scratch resistance/the antifouling property of the resultant test pieces of the solar cell panel are given in Table 12.

Example 13

The methyl methacrylate and the benzoyl peroxide were mixed at a rate of 100/0.5 and then heated up to 90° C. Then, the polymerization reaction was caused by dropping gradually the single side end-double bonds type organic silicon (CYLAPLANE TM-0701 manufactured by Chisso Corporation). Then, they were precipitated by using the coagulating solvent ethanol after about one hour lapsed. According to this method, the compounds whose composition ratio of the acryl resin/the single side end-double bond type organic silicon was 95/5 were prepared. The film-like moldings of the acrylic resin composition having a thickness of about 100 μm were obtained by drying these resultant resin compositions and then applying the thermal press formation to them.

The elastic layer was formed on the light receiving surface of the solar cell by coating the solution, that was obtained by dissolving the acrylic rubber (Nipol AR32 (manufactured by Nippon Zeon Co., Ltd.)) in the uncrosslinked state into the methylethyketone, by using the bar coater and then drying this solution.

Then, the test pieces of the solar cell were formed by overlapping the film-like moldings of the acrylic resin composition on this elastic layer and then molding this laminated body by the thermal press molding.

Evaluation results of the scratch resistance/the antifouling property of the resultant test pieces of the solar cell panel are given in Table 12 of FIG. 16.

Example 14

The methyl methacrylate and the benzoyl peroxide were mixed at a rate of 100/0.5 and then heated up to 90° C. Then, the polymerization reaction was caused by dropping gradually the single side end-double bonds type organic silicon (CYLAPLANE TM-0701 manufactured by Chisso Corporation). Then, they were precipitated by using the coagulating solvent ethanol after about one hour lapsed. According to this method, the compounds whose composition ratio of the acryl resin/the single side end-double bond type organic silicon was 95/5 were prepared. The compounds were ground and dried, and then were granulated by using the extruder and the pelletizer.

Then, the test pieces of the solar cell were formed by fixing the amorphous solar cell module fabricated on the polyimide base material such that the polyimide base material side comes into contact with the core surface of the injection mold, then clamping the molds, and then injecting the above acrylic resin composition into the molds.

Evaluation results of the scratch resistance/the antifouling property of the resultant test pieces of the solar cell panel are given in Table 12 of FIG. 16.

Comparative Example

The film-like moldings of about 100 μm thickness was obtained by molding the conventional acrylic resin which does not contain the organic silicon and the silica fine grains by the thermal press molding.

Then, the test pieces of the solar cell panel were fabricated by laminating the film-like moldings on the light receiving surface of the amorphous silicon solar cell module fabricated on the polyimide base material and then applying the thermal press molding to this laminated body.

Evaluation results of the scratch resistance/the antifouling property of the resultant test pieces of the solar cell panel are given in Table 12 of FIG. 16.

In Examples 12 to 14, the reduction rate of the conversion efficiency can be improved in contrast to Comparative Example using the conventional acrylic resin. The advantage of the coating member using the acrylic resin composition of the present invention can be recognized.

As described above, according to the present invention, since the acrylic resin composition is synthesized by adding the particular organic silicon-based compound and also adding the silica fine grains having the acrylate group at the end, the acrylic resin composition that is excellent in the frictional resistance, the scratch property, and the surface hardness can be provided not to damage the transparency.

The acrylic resin composition of the present invention can be applied as the clear layer of the painted-film and the coating member for the solar cell panel. Thus, the scratch resistance of them can be improved and also the frictional resistance, the scratch property, the surface hardness, the antifouling property, and the fine view in appearance of them can be improved without the reduction in the light transmittance due to the scratch and the dirt by the long-term use.

Also, the acrylic resin composition of the present invention can be utilized as not only the painted-film for the body panel of the car but also the exterior car body parts such as the winker, the tail lamp, the finisher, etc., the internal car body parts such as the cluster finisher, the meter hood, etc., the coating member such as the glass parts, or the like.

The entire contents of Japanese Patent Applications P2000-71110 (filed on Mar. 14, 2000) and P 2000-302156 (filed on Dec. 2, 2000) are incorporated herein by reference. Although the invention has been described above by reference to certain embodiments of the invention, the invention is not limited to the embodiments described above. Modifications and variations of the embodiments described above will occur to those skilled in the art, in light of the above teachings.

What is claimed is:

1. An acrylic resin composition comprising:
   an organic silicon based compound that can be copolymerized with or mixed with acryl monomer or methacryl monomer, the organic silicon based compound being of the following formula (III):

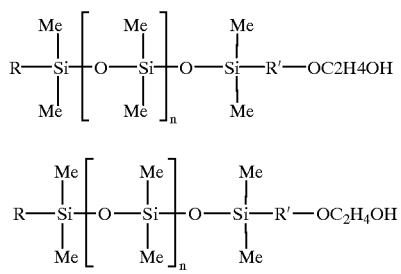

(III)

(III)

where R is an alkyl group, R' is an alkylene group, Me is a methyl group and n is 10 to 130; and 1 wt % to 30 wt % silica fine grains having hydroxyl groups or methyl groups bonded to their surfaces.

2. The acrylic resin composition according to claim 1, wherein the average molecular weight of the resin composition is 1000 to 10,000.

3. The acrylic resin composition according to claim 1, wherein a containing rate of the organic silicon based compound is 1 wt % to 30 wt %.

* * * * *